United States Patent
Pervan (10) Patent No.: US 10,137,659 B2
(45) Date of Patent: *Nov. 27, 2018

(54) FLOORBOARD AND METHOD FOR MANUFACTURING THEREOF

(71) Applicant: Välinge Innovation AB, Viken (SE)

(72) Inventor: Darko Pervan, Viken (SE)

(73) Assignee: VALINGE INNOVATION AB, Viken (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/207,868

(22) Filed: Jul. 12, 2016

(65) Prior Publication Data
US 2017/0037645 A1    Feb. 9, 2017

Related U.S. Application Data

(63) Continuation of application No. 14/324,677, filed on Jul. 7, 2014, now Pat. No. 9,410,328, which is a
(Continued)

(51) Int. Cl.
*E04F 15/00* (2006.01)
*B32B 3/06* (2006.01)
(Continued)

(52) U.S. Cl.
CPC ............ *B32B 3/06* (2013.01); *A47G 27/0293* (2013.01); *B27F 1/04* (2013.01); *B27F 1/06* (2013.01);
(Continued)

(58) Field of Classification Search
CPC ..... E04F 15/186; E04F 15/105; E04F 15/042; E04F 15/02194; E04F 15/041;
(Continued)

(56) References Cited

U.S. PATENT DOCUMENTS 213,740 A    4/1879  Connor
1,394,120 A    10/1921  Rockwell
(Continued)

FOREIGN PATENT DOCUMENTS

CA    2 252 791 A1    5/1999
CA    2 252 791 C     5/2004
(Continued)

OTHER PUBLICATIONS

International Search Report issued in PCT/SE2004/000243, dated May 19, 2004, Swedish Patent Office, Stockholm, SE, 2 pages.
(Continued)

*Primary Examiner* — Richard Chang
(74) *Attorney, Agent, or Firm* — Buchanan Ingersoll & Rooney P.C.

(57) ABSTRACT

Floorboards with a surface of flexible fibers for laying a mechanically joined floating floor, and methods for manufacturing and providing floorings containing such floorboards. For example, floorboards including a surface layer and a core, for making a floating flooring, which floorboards are mechanically lockable and which along their edge portions have pairs of opposing connectors for locking similar, adjoining floorboards to each other both vertically and horizontally, wherein the surface layer comprises flexible resilient fibers.

20 Claims, 7 Drawing Sheets

Related U.S. Application Data continuation of application No. 13/343,439, filed on Jan. 4, 2012, now Pat. No. 8,800,150, which is a continuation of application No. 11/822,686, filed on Jul. 9, 2007, now Pat. No. 8,112,891, which is a continuation of application No. 10/708,314, filed on Feb. 24, 2004, now abandoned.

(60) Provisional application No. 60/456,957, filed on Mar. 25, 2003.

(51) Int. Cl.
| | |
|---|---|
| *B32B 5/26* | (2006.01) |
| *A47G 27/02* | (2006.01) |
| *B27F 1/04* | (2006.01) |
| *B27F 1/06* | (2006.01) |
| *B27M 3/04* | (2006.01) |
| *B27M 3/08* | (2006.01) |
| *B32B 21/10* | (2006.01) |
| *E04F 15/04* | (2006.01) |
| *E04F 15/02* | (2006.01) |
| *E04F 15/10* | (2006.01) |
| *E04F 15/18* | (2006.01) |

(52) U.S. Cl.
CPC ............... *B27M 3/04* (2013.01); *B27M 3/08* (2013.01); *B32B 5/26* (2013.01); *B32B 21/10* (2013.01); *E04F 15/02038* (2013.01); *E04F 15/02194* (2013.01); *E04F 15/04* (2013.01); *E04F 15/041* (2013.01); *E04F 15/042* (2013.01); *E04F 15/102* (2013.01); *E04F 15/105* (2013.01); *E04F 15/107* (2013.01); *E04F 15/181* (2013.01); *E04F 15/186* (2013.01); *B32B 2307/102* (2013.01); *B32B 2471/00* (2013.01); *E04F 2201/0153* (2013.01); *E04F 2201/023* (2013.01); *E04F 2201/026* (2013.01); *E04F 2201/03* (2013.01); *E04F 2201/05* (2013.01); *E04F 2201/0517* (2013.01); *Y10T 29/49616* (2015.01); *Y10T 29/49623* (2015.01)

(58) Field of Classification Search
CPC . E04F 15/107; E04F 15/181; E04F 15/02038; E04F 15/102; B32B 21/10; B32B 3/06; B32B 5/26; A47G 27/0293; B27F 1/04
See application file for complete search history.

(56) References Cited

U.S. PATENT DOCUMENTS

| | | | |
|---|---|---|---|
| 1,787,027 A | 12/1930 | Wasleff |
| 1,925,070 A | 8/1933 | Livezey |
| 2,015,813 A | 10/1935 | Nielsen |
| 2,088,238 A | 7/1937 | Greenway |
| 2,089,075 A | 8/1937 | Siebs |
| 2,266,464 A | 12/1941 | Kraft |
| 2,303,745 A | 12/1942 | Karreman |
| 2,306,295 A | 12/1942 | Casto |
| 2,497,837 A | 2/1950 | Nelson |
| 2,740,167 A | 4/1956 | Rowley |
| 2,769,726 A | 11/1956 | Wetterau et al. |
| 2,818,895 A | 1/1958 | Zuber |
| 2,872,712 A | 2/1959 | Brown |
| 2,947,040 A | 8/1960 | Schultz |
| 3,055,461 A | 9/1962 | De Ridder |
| 3,087,269 A | 4/1963 | Hudson |
| 3,120,083 A | 2/1964 | Dahlberg et al. |
| 3,247,638 A | 4/1966 | Gay et al. |
| 3,259,417 A | 7/1966 | Chapman |
| 3,397,496 A | 8/1968 | Sohns |
| 3,436,888 A | 4/1969 | Ottosson |
| 3,538,665 A | 11/1970 | Gohner |
| 3,554,850 A | 1/1971 | Kuhle |
| 3,578,548 A | 5/1971 | Wesp |
| 3,694,983 A | 10/1972 | Couquet |
| 3,857,749 A | 12/1974 | Yoshida |
| 3,937,861 A | 2/1976 | Zuckerman et al. |
| 3,975,562 A | 8/1976 | Madebach |
| 4,037,377 A | 7/1977 | Howell et al. |
| 4,100,710 A | 7/1978 | Kowallik |
| 4,242,390 A | 12/1980 | Nemeth |
| 4,299,070 A | 11/1981 | Oltmanns et al. |
| 4,489,115 A | 12/1984 | Layman et al. |
| 4,570,353 A | 2/1986 | Evans |
| 4,574,099 A | 3/1986 | Nixon |
| 4,807,412 A | 2/1989 | Frederiksen |
| 4,944,514 A | 7/1990 | Suiter |
| 5,050,362 A | 9/1991 | Tal et al. |
| 5,112,671 A | 5/1992 | Diamond et al. |
| 5,134,026 A | 7/1992 | Melcher |
| 5,185,193 A | 2/1993 | Phenicie et al. |
| 5,229,217 A | 7/1993 | Holzer |
| 5,295,341 A | 3/1994 | Kajiwara |
| 5,333,429 A | 8/1994 | Cretti |
| 5,349,796 A | 9/1994 | Meyerson |
| 5,433,806 A | 7/1995 | Pasquali et al. |
| 5,502,939 A | 4/1996 | Zadok |
| 5,618,602 A | 4/1997 | Nelson |
| 5,671,575 A | 9/1997 | Wu |
| 5,706,621 A | 1/1998 | Pervan |
| 5,755,068 A | 5/1998 | Ormiston |
| 5,797,237 A | 8/1998 | Finkell, Jr. |
| 5,858,160 A | 1/1999 | Piacente |
| 5,900,099 A | 5/1999 | Sweet |
| 6,006,486 A | 12/1999 | Moriau |
| 6,029,416 A | 2/2000 | Anderson |
| 6,101,778 A | 8/2000 | Martensson |
| 6,139,945 A | 10/2000 | Krejchi et al. |
| 6,173,548 B1 | 1/2001 | Hamar et al. |
| 6,233,899 B1 | 5/2001 | Mellert et al. |
| 6,314,701 B1 | 11/2001 | Meyerson |
| 6,324,809 B1 | 12/2001 | Nelson |
| 6,332,733 B1 | 12/2001 | Hamberger et al. |
| 6,345,481 B1 | 2/2002 | Nelson |
| 6,363,677 B1 | 4/2002 | Chen |
| 6,397,547 B1 | 6/2002 | Martensson |
| 6,438,919 B1 | 8/2002 | Knauseder |
| 6,455,127 B1 | 9/2002 | Valtanen |
| 6,505,452 B1 | 1/2003 | Hannig |
| 6,536,178 B1 | 3/2003 | Palsson et al. |
| 6,546,691 B2 | 4/2003 | Leopolder |
| 6,558,070 B1 | 5/2003 | Valtanen |
| 6,591,568 B1 | 7/2003 | Palsson et al. |
| 6,617,009 B1 | 9/2003 | Chen et al. |
| 6,647,690 B1 | 11/2003 | Martensson |
| 6,671,968 B2 | 1/2004 | Shannon |
| 6,672,030 B2 | 1/2004 | Schulte |
| 6,675,545 B2 | 1/2004 | Chen et al. |
| 6,695,944 B2 | 2/2004 | Courtney |
| 6,711,869 B2 | 3/2004 | Tychsen |
| 6,715,253 B2 | 4/2004 | Pervan |
| 6,729,091 B1 | 5/2004 | Martensson |
| 6,761,008 B2 | 7/2004 | Chen et al. |
| 6,766,622 B1 | 7/2004 | Thiers |
| 6,769,218 B2 | 8/2004 | Pervan |
| 6,769,219 B2 | 8/2004 | Schwitte et al. |
| 6,786,019 B2 | 9/2004 | Thiers |
| 6,804,926 B1 | 10/2004 | Eisermann |
| 6,851,237 B2 | 2/2005 | Niese et al. |
| 6,854,235 B2 | 2/2005 | Martensson |
| 6,862,857 B2 | 3/2005 | Tychsen |
| 6,874,292 B2 | 4/2005 | Moriau |
| 6,880,305 B2 | 4/2005 | Pervan et al. |
| 6,880,307 B2 | 4/2005 | Schwitte |
| 6,895,881 B1 | 5/2005 | Whitaker |
| 6,898,911 B2 | 5/2005 | Kornfalt et al. |
| 6,898,913 B2 | 5/2005 | Pervan |
| 6,918,220 B2 | 7/2005 | Pervan |
| 6,922,964 B2 | 8/2005 | Pervan |

(56) References Cited

U.S. PATENT DOCUMENTS

| | | |
|---|---|---|
| 6,922,965 B2 | 8/2005 | Rosenthal et al. |
| 6,933,043 B1 | 8/2005 | Son et al. |
| 6,955,020 B2 | 10/2005 | Moriau et al. |
| 6,966,963 B2 | 11/2005 | O'Connor |
| 6,986,934 B2 | 1/2006 | Chen et al. |
| 7,051,486 B2 | 5/2006 | Pervan |
| 7,086,205 B2 | 8/2006 | Pervan |
| 7,090,430 B1 | 8/2006 | Fletcher |
| D528,671 S | 9/2006 | Grafenauer |
| 7,121,058 B2 | 10/2006 | Palsson et al. |
| 7,127,860 B2 | 10/2006 | Pervan et al. |
| 7,137,229 B2 | 11/2006 | Pervan |
| 7,169,460 B1 | 1/2007 | Chen et al. |
| 7,171,791 B2 | 2/2007 | Pervan |
| 7,211,310 B2 | 5/2007 | Chen et al. |
| 7,243,469 B2 | 7/2007 | Miller |
| 7,275,350 B2 | 10/2007 | Pervan et al. |
| 7,328,536 B2 | 2/2008 | Moriau et al. |
| 7,337,588 B1 | 3/2008 | Moebus |
| 7,356,971 B2 | 4/2008 | Pervan |
| 7,386,963 B2 | 6/2008 | Pervan |
| 7,398,625 B2 | 7/2008 | Pervan |
| 7,419,717 B2 | 9/2008 | Chen et al. |
| 7,454,875 B2 | 11/2008 | Pervan et al. |
| 7,516,588 B2 | 4/2009 | Pervan |
| 7,543,418 B2 | 6/2009 | Weitzer |
| 7,568,322 B2 | 8/2009 | Pervan et al. |
| 7,584,583 B2 | 9/2009 | Bergelin et al. |
| 7,739,849 B2 | 6/2010 | Pervan |
| 7,763,345 B2 | 7/2010 | Chen et al. |
| 7,779,597 B2 | 8/2010 | Thiers et al. |
| 7,802,415 B2 | 9/2010 | Pervan |
| 7,856,784 B2 | 12/2010 | Martensson |
| 7,856,789 B2 | 12/2010 | Eisermann |
| 7,866,115 B2 | 1/2011 | Pervan et al. |
| 7,886,497 B2 | 2/2011 | Pervan et al. |
| 7,896,571 B1 | 3/2011 | Hannig et al. |
| 7,926,234 B2 | 4/2011 | Pervan |
| 7,930,862 B2 | 4/2011 | Bergelin et al. |
| 7,980,043 B2 | 7/2011 | Moebus |
| 8,021,741 B2 | 9/2011 | Chen et al. |
| 8,028,486 B2 | 10/2011 | Pervan |
| 8,112,891 B2 | 2/2012 | Pervan |
| 8,234,829 B2 | 8/2012 | Thiers et al. |
| 8,245,478 B2 | 8/2012 | Bergelin et al. |
| 8,293,058 B2 | 10/2012 | Pervan et al. |
| 8,356,452 B2 | 1/2013 | Thiers et al. |
| 8,365,499 B2 | 2/2013 | Nilsson et al. |
| 8,480,841 B2 | 7/2013 | Pervan et al. |
| 8,511,031 B2 | 8/2013 | Bergelin et al. |
| 8,584,423 B2 | 11/2013 | Pervan et al. |
| 8,613,826 B2 | 12/2013 | Pervan et al. |
| 8,658,274 B2 | 2/2014 | Chen et al. |
| 8,683,698 B2 | 4/2014 | Pervan et al. |
| 8,756,899 B2 | 6/2014 | Nilsson et al. |
| 8,800,150 B2 | 8/2014 | Pervan |
| 8,833,028 B2 | 9/2014 | Whispell et al. |
| 8,834,992 B2 | 9/2014 | Chen et al. |
| 9,222,267 B2 | 12/2015 | Bergelin et al. |
| 9,249,581 B2 | 2/2016 | Nilsson et al. |
| 9,296,191 B2 | 3/2016 | Pervan et al. |
| 9,314,936 B2 | 4/2016 | Pervan |
| 9,410,328 B2 * | 8/2016 | Pervan ............... A47G 27/0293 |
| 2001/0021431 A1 | 9/2001 | Chen |
| 2002/0007608 A1 | 1/2002 | Pervan |
| 2002/0007609 A1 | 1/2002 | Pervan |
| 2002/0031646 A1 | 3/2002 | Chen |
| 2002/0046433 A1 | 4/2002 | Sellman et al. |
| 2002/0056245 A1 | 5/2002 | Thiers |
| 2002/0083673 A1 | 7/2002 | Kettler et al. |
| 2002/0092263 A1 | 7/2002 | Schulte |
| 2002/0095894 A1 | 7/2002 | Pervan |
| 2002/0100231 A1 | 8/2002 | Miller et al. |
| 2002/0112429 A1 | 8/2002 | Niese et al. |
| 2002/0112433 A1 | 8/2002 | Pervan |
| 2002/0142135 A1 | 10/2002 | Chen et al. |
| 2002/0170257 A1 | 11/2002 | McLain et al. |
| 2002/0170258 A1 | 11/2002 | Schwitte et al. |
| 2002/0178674 A1 | 12/2002 | Pervan |
| 2002/0178681 A1 | 12/2002 | Zancai |
| 2002/0189183 A1 | 12/2002 | Ricciardelli |
| 2003/0009971 A1 | 1/2003 | Palmberg |
| 2003/0024199 A1 | 2/2003 | Pervan |
| 2003/0024200 A1 | 2/2003 | Moriau et al. |
| 2003/0033777 A1 | 2/2003 | Thiers et al. |
| 2003/0101674 A1 | 6/2003 | Pervan et al. |
| 2003/0101681 A1 | 6/2003 | Tychsen |
| 2003/0154676 A1 | 8/2003 | Schwartz |
| 2003/0196397 A1 | 10/2003 | Niese et al. |
| 2003/0196405 A1 | 10/2003 | Pervan |
| 2004/0031227 A1 | 2/2004 | Knauseder |
| 2004/0035078 A1 | 2/2004 | Pervan |
| 2004/0068954 A1 | 4/2004 | Martensson |
| 2004/0107659 A1 | 6/2004 | Glockl |
| 2004/0139678 A1 | 7/2004 | Pervan |
| 2004/0177584 A1 | 9/2004 | Pervan |
| 2004/0182036 A1 | 9/2004 | Sjöberg et al. |
| 2004/0206036 A1 | 10/2004 | Pervan |
| 2004/0211144 A1 | 10/2004 | Stanchfield |
| 2004/0255541 A1 | 12/2004 | Thiers et al. |
| 2005/0003160 A1 | 1/2005 | Chen et al. |
| 2005/0055943 A1 | 3/2005 | Pervan |
| 2005/0138881 A1 | 6/2005 | Pervan |
| 2005/0166502 A1 | 8/2005 | Pervan |
| 2005/0166516 A1 | 8/2005 | Pervan |
| 2005/0208255 A1 | 9/2005 | Pervan |
| 2005/0210810 A1 | 9/2005 | Pervan |
| 2005/0268570 A2 | 12/2005 | Pervan |
| 2006/0032168 A1 | 2/2006 | Thiers |
| 2006/0048474 A1 | 3/2006 | Pervan et al. |
| 2006/0075713 A1 | 4/2006 | Pervan et al. |
| 2006/0101769 A1 | 5/2006 | Pervan et al. |
| 2006/0196139 A1 | 9/2006 | Pervan |
| 2006/0283127 A1 | 12/2006 | Pervan |
| 2007/0011981 A1 | 1/2007 | Eiserman |
| 2007/0028547 A1 | 2/2007 | Grafenauer et al. |
| 2007/0175143 A1 | 8/2007 | Pervan et al. |
| 2007/0175144 A1 | 8/2007 | Hakansson |
| 2007/0175148 A1 | 8/2007 | Bergelin et al. |
| 2007/0175156 A1 | 8/2007 | Pervan et al. |
| 2007/0196624 A1 | 8/2007 | Chen et al. |
| 2008/0000179 A1 | 1/2008 | Pervan |
| 2008/0000180 A1 | 1/2008 | Pervan |
| 2008/0000182 A1 | 1/2008 | Pervan |
| 2008/0000183 A1 | 1/2008 | Bergelin et al. |
| 2008/0000186 A1 | 1/2008 | Pervan |
| 2008/0000187 A1 | 1/2008 | Pervan |
| 2008/0000188 A1 | 1/2008 | Pervan |
| 2008/0000189 A1 | 1/2008 | Pervan et al. |
| 2008/0000194 A1 | 1/2008 | Pervan |
| 2008/0000417 A1 | 1/2008 | Pervan et al. |
| 2008/0005989 A1 | 1/2008 | Pervan et al. |
| 2008/0005992 A1 | 1/2008 | Pervan |
| 2008/0005997 A1 | 1/2008 | Pervan |
| 2008/0005998 A1 | 1/2008 | Pervan |
| 2008/0005999 A1 | 1/2008 | Pervan |
| 2008/0008871 A1 | 1/2008 | Pervan |
| 2008/0010931 A1 | 1/2008 | Pervan |
| 2008/0010937 A1 | 1/2008 | Pervan |
| 2008/0028707 A1 | 2/2008 | Pervan |
| 2008/0028713 A1 | 2/2008 | Pervan |
| 2008/0034167 A1 | 2/2008 | Pervan |
| 2008/0034708 A1 | 2/2008 | Pervan |
| 2008/0041007 A1 | 2/2008 | Pervan et al. |
| 2008/0041008 A1 | 2/2008 | Pervan |
| 2008/0060308 A1 | 3/2008 | Pervan |
| 2008/0066415 A1 | 3/2008 | Pervan et al. |
| 2008/0104921 A1 | 5/2008 | Pervan et al. |
| 2008/0110125 A1 | 5/2008 | Pervan |
| 2008/0134607 A1 | 6/2008 | Pervan et al. |
| 2008/0134613 A1 | 6/2008 | Pervan et al. |
| 2008/0134614 A1 | 6/2008 | Pervan et al. |
| 2008/0172971 A1 | 7/2008 | Pervan |
| 2008/0256890 A1 | 10/2008 | Pervan |

(56) References Cited

U.S. PATENT DOCUMENTS

| | | |
|---|---|---|
| 2008/0311355 A1 | 12/2008 | Chen et al. |
| 2009/0133353 A1 | 5/2009 | Pervan et al. |
| 2009/0155612 A1 | 6/2009 | Pervan et al. |
| 2009/0193748 A1 | 8/2009 | Boo et al. |
| 2009/0249733 A1 | 10/2009 | Moebus |
| 2010/0260962 A1 | 10/2010 | Chen et al. |
| 2010/0300030 A1 | 12/2010 | Pervan et al. |
| 2011/0030303 A1 | 2/2011 | Pervan et al. |
| 2011/0041996 A1 | 2/2011 | Pervan |
| 2011/0056167 A1 | 3/2011 | Nilsson et al. |
| 2011/0131901 A1 | 6/2011 | Pervan et al. |
| 2011/0154763 A1 | 6/2011 | Bergelin et al. |
| 2011/0247748 A1 | 10/2011 | Pervan et al. |
| 2012/0003439 A1 | 1/2012 | Chen et al. |
| 2012/0040149 A1 | 2/2012 | Chen et al. |
| 2012/0137617 A1 | 6/2012 | Pervan |
| 2012/0216472 A1 | 8/2012 | Martensson |
| 2012/0279154 A1 | 11/2012 | Bergelin et al. |
| 2013/0014890 A1 | 1/2013 | Pervan et al. |
| 2013/0047536 A1 | 2/2013 | Pervan |
| 2013/0111758 A1 | 5/2013 | Nilsson et al. |
| 2013/0269863 A1 | 10/2013 | Pervan et al. |
| 2013/0298487 A1 | 11/2013 | Bergelin et al. |
| 2014/0033635 A1 | 2/2014 | Pervan et al. |
| 2014/0069044 A1 | 3/2014 | Wallin |
| 2014/0115994 A1 | 5/2014 | Pervan |
| 2014/0237924 A1 | 8/2014 | Nilsson et al. |
| 2014/0283466 A1 | 9/2014 | Boo |
| 2014/0318061 A1 | 10/2014 | Pervan |
| 2014/0352248 A1 | 12/2014 | Whispell et al. |
| 2014/0356594 A1 | 12/2014 | Chen et al. |
| 2015/0225964 A1 | 8/2015 | Chen et al. |
| 2016/0016390 A1 | 1/2016 | Lundblad et al. |
| 2016/0016391 A1 | 1/2016 | Lundblad et al. |
| 2016/0052245 A1 | 2/2016 | Chen et al. |
| 2016/0069089 A1 | 3/2016 | Bergelin et al. |
| 2016/0108624 A1 | 4/2016 | Nilsson et al. |
| 2016/0186318 A1 | 6/2016 | Pervan et al. |
| 2016/0194883 A1 | 7/2016 | Pervan |
| 2016/0194885 A1 | 7/2016 | Whispell et al. |
| 2016/0201324 A1 | 7/2016 | Håkansson et al. |
| 2016/0265234 A1 | 9/2016 | Pervan |

FOREIGN PATENT DOCUMENTS

| | | |
|---|---|---|
| CN | 2076142 U | 5/1991 |
| CN | 2106197 U | 6/1992 |
| CN | 2124276 U | 12/1992 |
| CN | 1270263 A | 10/2000 |
| DE | 1 081 653 | 5/1960 |
| DE | 28 32 817 A1 | 2/1980 |
| DE | 35 38 538 A1 | 5/1987 |
| DE | 39 04 686 C1 | 8/1989 |
| DE | 40 20 682 A1 | 1/1992 |
| DE | 42 42 530 A1 | 6/1994 |
| DE | 295 17 995 U1 | 3/1996 |
| DE | 198 54 475 A1 | 7/1999 |
| DE | 200 02 744 U1 | 9/2000 |
| DE | 200 18 817 U1 | 2/2001 |
| DE | 100 01 248 A1 | 7/2001 |
| DE | 100 32 204 C1 | 7/2001 |
| DE | 100 06 748 A1 | 8/2001 |
| DE | 202 06 460 U1 | 8/2002 |
| DE | 202 07 844 U | 8/2002 |
| DE | 198 54 475 B4 | 6/2006 |
| EP | 0 665 347 A1 | 8/1995 |
| EP | 0 903 451 A2 | 3/1999 |
| EP | 0 903 451 A3 | 8/1999 |
| EP | 1 045 083 A1 | 10/2000 |
| EP | 1 061 201 A2 | 12/2000 |
| EP | 1 165 906 | 1/2002 |
| EP | 1 165 906 B1 | 8/2002 |
| EP | 1 045 083 B1 | 10/2002 |
| EP | 1 262 609 A1 | 12/2002 |
| EP | 1 357 239 A2 | 10/2003 |
| EP | 1 362 947 A2 | 11/2003 |
| EP | 1 357 239 A3 | 7/2004 |
| FR | 2 810 060 A1 | 12/2001 |
| GB | 1 308 011 | 2/1973 |
| GB | 1 430 423 A | 3/1976 |
| GB | 1 520 964 A | 8/1978 |
| GB | 2 020 998 A | 11/1979 |
| GB | 2 117 813 A | 10/1983 |
| GB | 2 243 381 A | 10/1991 |
| GB | 2 256 023 A | 11/1992 |
| JP | 56-104936 U | 1/1981 |
| JP | 56-131752 A | 10/1981 |
| JP | 57-157636 U | 10/1982 |
| JP | 59-185346 U | 12/1984 |
| JP | 60-255843 A | 12/1985 |
| JP | 1-178659 A | 7/1989 |
| JP | 1-33702 Y2 | 10/1989 |
| JP | 5-96282 U | 12/1993 |
| JP | 05-318674 A | 12/1993 |
| JP | 6-39840 B2 | 5/1994 |
| JP | 7-26467 U | 5/1995 |
| JP | 7-180333 A | 7/1995 |
| JP | 8-086080 A | 4/1996 |
| JP | 8-109734 A | 4/1996 |
| JP | 9-053319 A | 2/1997 |
| JP | 10-002096 A | 1/1998 |
| JP | 1-202403 A | 8/1998 |
| JP | 10-219975 A | 8/1998 |
| JP | 11-131771 A | 5/1999 |
| JP | 11-268010 A | 10/1999 |
| JP | 2002-011708 A | 1/2002 |
| JP | 3363976 B2 | 1/2003 |
| KR | 1996-0005785 | 7/1996 |
| SE | 506 254 C2 | 11/1997 |
| SE | 0000785 A | 9/2001 |
| SE | 0103130 A | 3/2003 |
| WO | WO 89/03753 A1 | 5/1989 |
| WO | WO 90/06232 A1 | 6/1990 |
| WO | WO 94/01628 A2 | 1/1994 |
| WO | WO 94/26999 A1 | 11/1994 |
| WO | WO 96/27721 A1 | 9/1996 |
| WO | WO 97/47834 A1 | 12/1997 |
| WO | WO 98/38401 A1 | 9/1998 |
| WO | WO 98/58142 A1 | 12/1998 |
| WO | WO 99/17930 A1 | 4/1999 |
| WO | WO 99/58254 A1 | 11/1999 |
| WO | WO 99/66151 A1 | 12/1999 |
| WO | WO 99/66152 A1 | 12/1999 |
| WO | WO 00/17467 A1 | 3/2000 |
| WO | WO 00/22225 A1 | 4/2000 |
| WO | WO 00/47841 A1 | 8/2000 |
| WO | WO 00/66856 A1 | 11/2000 |
| WO | WO 01/02669 A1 | 1/2001 |
| WO | WO 01/02670 A1 | 1/2001 |
| WO | WO 01/02671 A1 | 1/2001 |
| WO | WO 01/47726 A1 | 7/2001 |
| WO | WO 01/48331 A1 | 7/2001 |
| WO | WO 01/48332 A1 | 7/2001 |
| WO | WO 01/48333 A1 | 7/2001 |
| WO | WO 01/51732 A1 | 7/2001 |
| WO | WO 01/51733 A1 | 7/2001 |
| WO | WO 01/53628 A1 | 7/2001 |
| WO | WO 01/66877 A1 | 9/2001 |
| WO | WO 01/75247 A1 | 10/2001 |
| WO | WO 01/77461 A1 | 10/2001 |
| WO | WO 01/88306 A1 | 11/2001 |
| WO | WO 02/055809 A1 | 7/2002 |
| WO | WO 02/055810 A1 | 7/2002 |
| WO | WO 02/060691 A1 | 8/2002 |
| WO | WO 02/092342 A1 | 11/2002 |
| WO | WO 03/012224 A1 | 2/2003 |
| WO | WO 03/016655 A1 | 2/2003 |
| WO | WO 03/025307 A1 | 3/2003 |
| WO | WO 03/078761 A1 | 9/2003 |
| WO | WO 03/083234 A1 | 10/2003 |
| WO | WO 03/089736 A1 | 10/2003 |
| WO | WO 2004/005648 A1 | 1/2004 |
| WO | WO 2004/053257 A1 | 6/2004 |

(56) References Cited

FOREIGN PATENT DOCUMENTS

| WO | WO 2004/085765 A1 | 10/2004 |
| WO | WO 2004/053257 A8 | 12/2004 |
| WO | WO 2005/068747 A1 | 7/2005 |

OTHER PUBLICATIONS

Official Action issued in JP Patent Application No. 2006-502812 and English-language translation thereof, dated Nov. 13, 2009, Japan Patent Office, JP, 2 pages (JP Office Action), 2 pages (English-language translation).
Official Action issued in EP Patent Application No. 04 714 059.5, dated Jul. 31, 2009, European Patent Office, 2 pages.
Official Action issued in EP Patent Application No. 04 714 059.5, dated Dec. 7, 2009, European Patent Office, 2 pages.

* cited by examiner

FLOORBOARD AND METHOD FOR MANUFACTURING THEREOF

CROSS-REFERENCE TO RELATED APPLICATIONS

The present application is a continuation of U.S. application Ser. No. 14/324,677, filed on Jul. 7, 2014, which is a continuation of U.S. application Ser. No. 13/343,439, filed on Jan. 4, 2012, now U.S. Pat. No. 8,800,150, which is a continuation of U.S. application Ser. No. 11/822,686, filed on Jul. 9, 2007, now U.S. Pat. No. 8,112,891, which is a continuation of U.S. application Ser. No. 10/708,314, filed on Feb. 24, 2004, now abandoned, which claims the benefit of Swedish Patent Application No. SE 0300479-3, filed in Sweden on Feb. 24, 2003, and U.S. Provisional Application No. 60/456,957, filed in the United States on Mar. 25, 2003. The contents of U.S. application Ser. No. 14/324,677, U.S. application Ser. No. 13/343,439, U.S. Pat. No. 8,800,150, U.S. application Ser. No. 11/822,686, U.S. Pat. No. 8,112,891, U.S. application Ser. No. 10/708,314, SE 0300479-3 and U.S. 60/456,957 are expressly incorporated herein by reference in their entirety.

TECHNICAL FIELD

The invention relates generally to the technical field of floorboards. The invention concerns floorboards with a sound-absorbing surface of fibers which can be joined mechanically in different patterns. The invention also concerns methods for manufacturing such floorboards. The invention is particularly suited for use in floating floors.

FIELD OF APPLICATION

The present invention is particularly suited for use in floating floors with mechanical joint systems. Such floors often consist of a surface layer of laminate or wood, a core and a balancing layer and are formed as rectangular floorboards intended to be joined mechanically, i.e. without glue, along both long sides and short sides in the vertical and horizontal direction.

The following description of known technique, problems of known systems, as well as the object and features of the invention will therefore as non-limiting examples be aimed mainly at this field of application. However, it should be emphasized that the invention can be used in optional floorboards which have a surface layer and a core. The invention may thus also be applicable to floors that are nailed or glued to a base.

BACKGROUND OF THE INVENTION

Floating floors with mechanical joint systems and with a surface of laminate or wood have in recent years taken large shares of the market from, for instance, carpets and plastic flooring but also from wooden flooring that is glued to the base. One reason is that these floors can be laid quickly and easily on a subfloor that does not have to be perfectly smooth or flat. They can move freely from the subfloor. Shrinkage and swelling occur under the baseboards and the joints between the floorboards are tight. A floating floor with a mechanical joint system can easily be taken up and laid once more. Individual floorboards can be replaced, the subfloor is accessible for renovation and the entire floor can be moved to a different room.

Plastic floors and textile floor coverings that are glued to the subfloor require a perfectly flat subfloor. Laying is complicated and the flooring cannot be removed without being damaged. Such floorings are advantageous since they can be supplied in widths of for instance 4 m. There are few joints. Plastic floorings are impermeable to water, and both plastic flooring and textile flooring are soft and produce a lower sound level than laminates and wooden floors.

Thus, floating floors have many advantages over floors that are glued to the subfloor. A great drawback of such floating floors with a hard surface of wood or laminate is, however, that they produce a high sound level with people walking on the floor. The sound level can be annoying especially in public places, such as offices, hotels and business premises where there are many people walking around. It would be possible to use floating floors to a greater extent if the sound level could be reduced.

DEFINITION OF SOME TERMS

In the following text, the visible surface of the installed floorboard is called "front side", while the opposite side of the floorboard, facing the subfloor, is called "rear side". The sheet-shaped starting material that is used in manufacture is called "core". When the core is coated with a surface layer closest to the front side and preferably also a balancing layer closest to the rear side, it forms a semi-manufacture which is called "floor panel" or "floor element" in the case where the semi-manufacture, in a subsequent operation, is divided into a plurality of floor panels mentioned above. When the floor panels are machined along their edges so as to obtain their final shape with the joint system, they are called "floorboards". By "surface layers" are meant all layers applied to the core closest to the front side and covering preferably the entire front side of the floorboard. By "decorative surface layer" is meant a layer which is essentially intended to give the floor its decorative appearance. "Wear layer" relates to a layer which is mainly adapted to improve the durability of the front side. By "laminate flooring" is meant flooring that is available on the market under this designation. The wear layer of the laminate flooring consists as a rule of a transparent sheet of paper which is impregnated with melamine resin, with aluminum oxide added. The decorative layer consists of a melamine impregnated decorative sheet of paper. The core is as a rule a wood-fiber-based sheet. By "HDF" is meant sheet material that is known on the market under the designation high density fiberboard, HDF, consisting of ground wood fibers joined by a binder. When a HDF sheet is manufactured with a lower density, it is called MDF (Medium Density Fiberboard).

The outer parts of the floorboard at the edge of the floorboard between the front side and the rear side are called "joint edge". As a rule, the joint edge has several "joint surfaces" which can be vertical, horizontal, angled, rounded, beveled etc. These joint surfaces exist on different materials, for instance laminate, fiberboard, wood, plastic, metal (especially aluminum) or sealing material. By "joint" or "locking system" are meant coacting connecting means which connect the floorboards vertically and/or horizontally. By "mechanical locking system" is meant that joining can take place without glue horizontally parallel to the surface and vertically perpendicular to the surface. Mechanical joint systems can in many cases also be joined by means of glue. By "floating floor" is meant flooring with floorboards which are only joined with their respective joint edges and thus not glued to the subfloor. In case of movement due to moisture, the joint remains tight. Movement due to moisture takes place in the outer areas of the floor along the walls hidden under the baseboards. By "textile floor" is meant soft flooring which consists of oil-based synthetic fibers or natural fibers joined to form a carpet or felt. The flooring is usually produced in a width of about 4 m and a length that can be several hundred meters. The flooring is delivered from the factory usually in rolls and is usually installed by gluing to a subfloor. By "needle felt" is meant a fiber-based felt which is sold on the market under the designation needle felt carpet. This floor consists of oil-based fibers of e.g. polypropylene (PP), nylon (PA) or polyester (PES) which are joined to form a felt. Joining takes place by a fiber mat being punched by means of hooked needles. The rear side is usually coated with foam which may consist of latex and chalk.

KNOWN TECHNIQUE AND PROBLEMS THEREOF

To facilitate the understanding and the description of the present invention as well as the knowledge of the problems behind the invention, a description of known technique now follows. Floorboards which in the following are referred to as rectangular with long sides and short sides can also be square.

Hard floorings with a surface of laminate or wood cause a high sound level. The high sound level arises mainly as people walk on the hard laminate or wood surface. The sound that is produced at the surface causes a high sound level in the room. The sound also penetrates the floor and into the beams and joists. To solve this problem, floating floors have been installed on a base of cardboard, felt, foam or like materials. The reduction of sound thus occurs on the rear side of the floorboard by means of special underlay materials that are applied between the floating flooring and the subfloor. This can cause a considerable dampening of the sound level between two floor levels. The reduction of sound that can be achieved in the room is of a limited extent.

Another method of reducing the sound level is to glue the floorboards to the subfloor. This results in a certain reduction of sound in the room, and the sound frequency is felt to be more pleasant. The costs are high and the laying quality is poor, with many and large joint gaps. A third method is to provide the surface of the floorboard with a surface layer of e.g. cork. This material is softer than wood and laminate and reduces the sound level. A cork floor, however, suffers from a number of drawbacks. Durability and impression strength are relatively low, cost is high and sound reduction may be insufficient.

SUMMARY OF INVENTION

An object of the present invention is to provide floorboards which can be joined mechanically to form a floating flooring with a low sound level. Such a flooring should at the same time have an attractive appearance and allow manufacture with great accuracy.

The invention is based on a first understanding that a low sound level should above all be provided using a surface layer which does not produce a high sound level when being hit with hard materials on its surface.

The invention is based on a second understanding that floorboards with a soft surface layer having a low density have a lower sound level than floorboards with surface layers that are hard and have a high density.

The invention is based on a third understanding that it is possible to provide a surface layer at a low cost, which is sound absorbing and has high durability and impact strength. Such a surface layer should consist of fibers that are flexible and which can be compressed when the floor is subjected to a load, for instance with people walking on its surface. These fibers can be made of materials having a relatively high density and being very strong, for instance synthetic fibers or natural fibers such as wool. When the fibers are thin and joined to form a felt or a carpet with air between the flexible fibers, a surface layer is produced with is soft and has low density. The thickness of the fibers may be, for instance, 0.05-0.10 mm. The volume density of the surface layer can be below 400 kg/m$^3$, and it can preferably have a density of 150-300 kg/m$^2$. This is considerably lower than wood, laminate and cork and the sound level is significantly lower than for all these materials.

The invention is based on a fourth and highly surprising understanding that a fiber-based surface layer with low density, for instance in the form of a needle felt mat, can be applied by, for instance, gluing to a core of e.g. fiberboard. The core can be, for instance, a particle board, MDF or HDF. This floor element can, for instance, by sawing be divided into floor panels which are machined using, for instance, a combination of rotary knives and diamond tools so that they form floorboards in a floating floor. The upper joint edges can be formed in such a manner that, at the surface, they consist mainly of free fibers and closest to the core, fibers joined to the core. The surface layer can then be manufactured with great accuracy and without loose fibers. The fibers closest to the core can be joined by mixing with a flexible material, such as latex. This gives the surface layer better stability and facilitates cleaning since dirt cannot penetrate into the lower parts of the surface layer. Thin surface layer will be easier to handle if they are integrated with a core.

The invention is based on a fifth understanding that these floorboards can be joined by means of a mechanical joint system which on the one hand positions the floor-boards with great accuracy relative to each other and which at the same time holds upper joint edges in close contact. The joints between the floorboards will be very tight and they can be made essentially invisible to the eye.

The invention is based on a sixth understanding that a floating floor with a fiber surface can be installed quickly and rationally and at a cost that does not have to exceed the cost of putty-coating of subfloors and gluing and cutting of a textile floor covering. Attractive patterns can be provided, for instance, by floorboards with different formats and different colors of the surface layer being joined to each other with an exact fit. Attractive patterns can be created, for instance with a surface of needle felt which normally does not allow very great variation in pattern. Thin fiber layers, for instance 1-2 mm, which are integrated with a smooth core, can provide a perfectly smooth floor. For instance, when a needle felt carpet is glued to a fiberboard, the surface will be highly stable as to shape. This facilitates, for example, printing of advanced patterns on the fiber surface. Durability increases if the surface is flat without rises.

The invention is based on a seventh understanding that a floating floor with a sound-absorbing fiber surface and a mechanical joint system is easy to take up. Such a floor is particularly convenient for temporary exhibitions, business premises and the like, in which the floor is changed frequently, and in premises subjected to great wear. Floorboards in connection with, for example, entrance portions, in which wear and soiling is great, can easily be exchanged.

Finally, the invention is based on an eighth understanding that floors with different surface layers can be provided with mechanical joint systems so as to be join-able to each other. In this way, combination floors can be provided which, for instance, consist of laminate floor and needle felt floor. If the floorboards have a similar thickness, the floor will be smooth. In walking areas, such a floor can have a surface of needle felt in order to dampen the sound level. The other surfaces may consist of, for instance, floorboards with a surface of laminate, linoleum, wood or plastic. These surfaces are easy to clean, and suitable combinations of materials can provide an attractive design.

The above thus means that according to the invention it is possible to provide a floor having all the advantages of a floating laminate or wooden floor while at the same time one of the major drawbacks can be eliminated by means of a surface layer of fibers that does not generate a high sound level.

This object is achieved wholly or partly by floorboards and a method for manufacturing that are evident from the independent claims. The dependent claims define particularly preferred embodiments of the invention.

According to a first aspect, in one embodiment, the present invention comprises rectangular or square floorboards for making a floating flooring, which floorboards are mechanically lockable and which along their edge portions have pairs of opposing connecting means for locking of adjoining floorboards to each other both vertically and horizontally (D1 and D2 respectively), wherein the surface layer of the floorboards consists of flexible and resilient fibers.

In this context, the term "consists of" should be interpreted as "consisting substantially of", taking into account that the surface layer, in addition to the fibers, may also comprise e.g. fiber binders, backing layers, fiber treatment agents (for repelling dirt, flame retardants etc.) or matter resulting from printing of the surface.

According to a preferred embodiment of this first aspect, the floorboards can be provided with a surface layer which consists of needle felt with a density below 400 kg/m$^3$.

Several variants of the invention are feasible. The floorboards can be provided with any known mechanical joint system. Examples of known mechanical joint systems are provided in WO 94/26999, WO 97/47834, WO 99/66151, WO 99/66152, FR-2 810 060, WO 02/055809, WO 02/055810 and WO 03/083234. Such floorboards can be laid by different combinations of angling, horizontal snapping-in, vertical snapping-in or folding and insertion along the joint edge. The floorboards can also have mirror-inverted joint systems that allow joining of long side to short side or optional sides if the boards are square.

According to a second aspect, in one embodiment, the present invention comprises a method for rational manufacture of floorboards as described above. According to this method, a surface layer consisting of flexible fibers are joined to a core in order to form a floor element. Joining can occur, for example, by gluing, and the core may consist of a wood-fiber-based material such as HDF, MDF, particle board, plywood etc. This floor element is then sawn up and machined to a floorboard using a rotary tool. This means that the manufacturing technique is characterized in that the surface layer is formed by machining in connection with the finishing of the joint edges of the floor panel.

The embodiments of the invention will now be described in more detail with reference to the accompanying schematic drawings which by way of example illustrate currently preferred embodiments of the invention according to its various aspects.

DESCRIPTION OF PREFERRED EMBODIMENTS

Figure 1A:
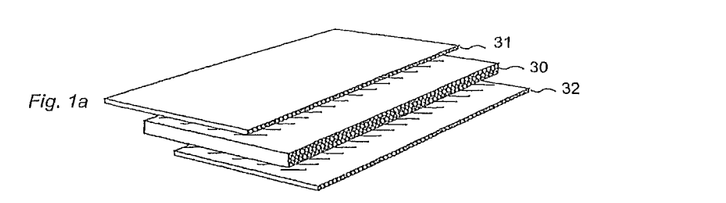
FIGS. 1a-d illustrate manufacture of a floorboard according to an embodiment of the invention.
Figure 1B:
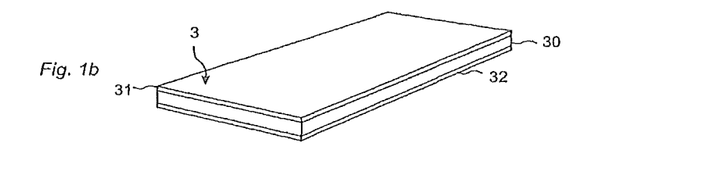
Figure 1C:
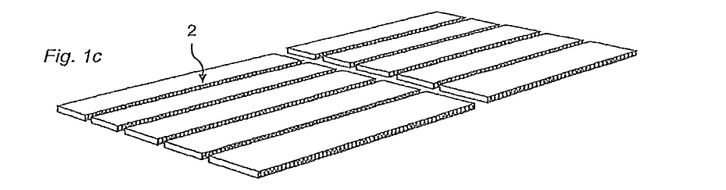
Figure 1D:
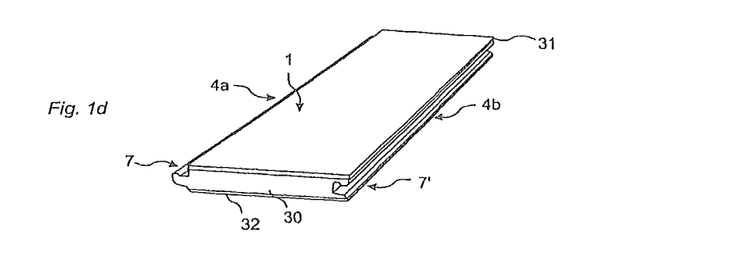

FIGS. 1a-d illustrate the manufacture of a floorboard according to an embodiment of the invention. A layer 31, which in this embodiment consists of needle felt, is joined, for instance, by gluing to a core 30. This core may consist of, for example, particle board, fiberboard, such as MDF, HDF, plywood or the like. A lower layer, for instance a balancing layer 32, can be applied to the rear side to prevent cupping. This rear layer can also be a soft material, such as foam, needle felt, cardboard or the like, which levels irregularities in the subfloor and which improves the reduction of sound. This lower layer is in some applications not necessary. The floor element 3, which may have a thickness of e.g. 5-20 mm, is then divided into a plurality of floor panels 2. These panels are then machined and joint edge portions are formed so as to constitute a mechanical joint system 7, 7'. An example of such a joint system on the long sides 4a and 4b is shown in FIG. 1d. The floorboards could be produced in several alternative ways. For example the surface layer 31 and/or the balancing layer 32 could be applied on the core of the floor panels and not on the core of the floor elements.

Figure 2A:
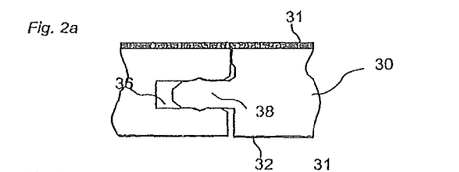
FIGS. 2a-d show examples of mechanical joint systems which can be used in embodiments of the invention.
Figure 2B:
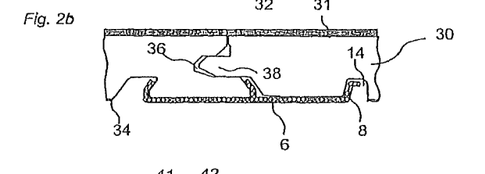
Figure 2C:
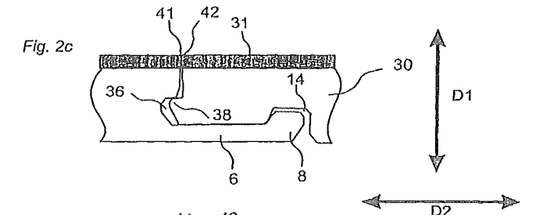
Figure 2D:
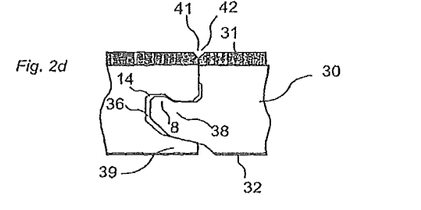

FIGS. 2a-d show examples of mechanical joint systems which can be used in the invention. The joint system according to FIG. 2a can be joined by vertical snapping-in. In the joint system according to FIGS. 2b and 2c, a groove 36 and a tongue 38 form the vertical joint D1. A strip 6, a locking element 8 and a locking groove 14 form the horizontal joint D2. These locking systems can be joined by angling and horizontal snapping-in. If upper joint edges 41, 42 are compressible, the joint system in FIG. 2c can be locked by vertical snapping-in. If the tongue 32 is removed, the locking could be accomplished with vertical folding without any snapping. A surface layer 31, which consists of e.g. needle felt, can be pressed together, and this facilitates vertical snapping-in. FIG. 2d shows a different embodiment which can be joined by angling and snapping-in. Upper joint edges 41, 42 have in this embodiment a beveled portion.

In one embodiment, the floorboard, on a first pair of opposing joint edges, is provided with a mechanical locking system adapted for locking the floorboard to an adjoining floorboard both vertically D1 and horizontally D2. This first pair of opposing joint edges may be the floorboard's long edges. A second pair of opposing joint edges may be provided with a mechanical locking adapted for locking the floorboard to an adjoining floorboard vertically and/or horizontally. This second pair of opposing joint edges may be the floorboard's short edges.

In one embodiment, the second pair of opposing joint edges is provided with a mechanical locking system which only provides locking in the vertical direction, such as is the case with a known tongue-and-groove system.

In another embodiment, the second pair of opposing joint edges are provided with a mechanical locking system which only provides locking in the horizontal direction, such as would be the case if the tongue 38 of any one of the embodiments of FIG. 2b or 2c was to be removed, while leaving the locking strip 6 with its locking element 8 and the locking groove 14. In FIG. 2d such a case would be accomplished if the tongue 38 or the lower lip 39 will be removed.

Figure 3A:
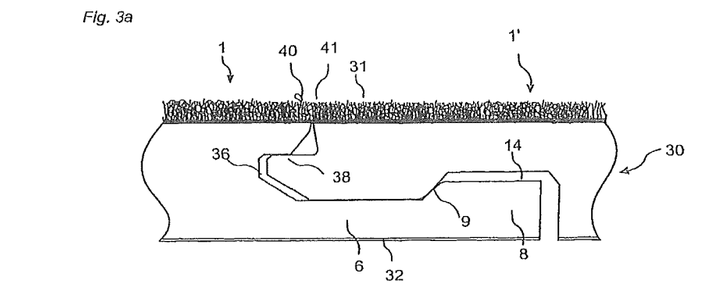
FIGS. 3a-c show an embodiment of the invention.
Figure 3B:
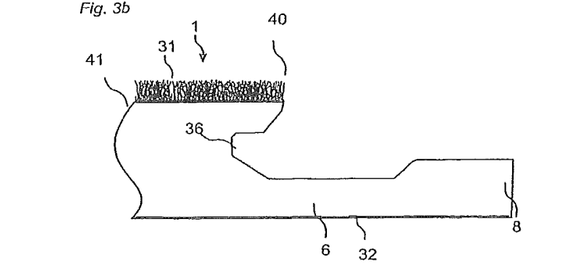
Figure 3C:
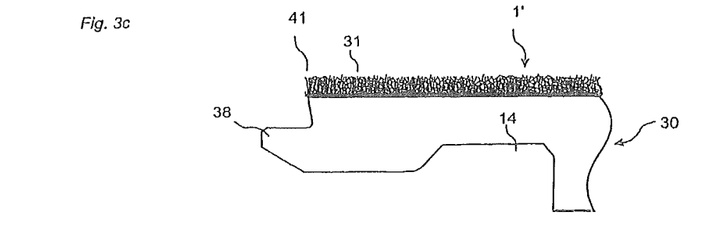
Figure 4A:
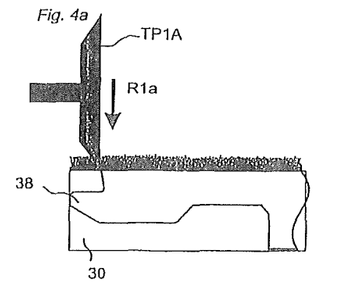
FIGS. 4a-f illustrate the manufacture of the joint edge portion according to an embodiment of the invention.
Figure 4B:
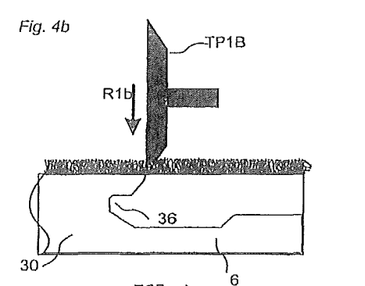
Figure 4C:
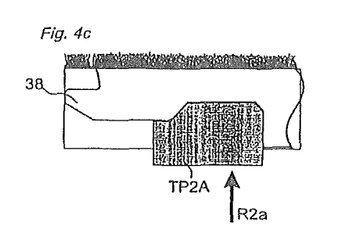
Figure 4D:
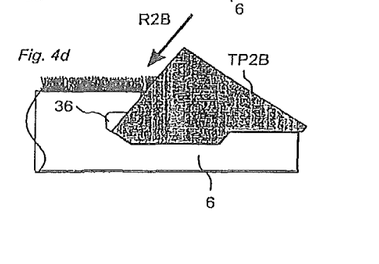
Figure 4E:
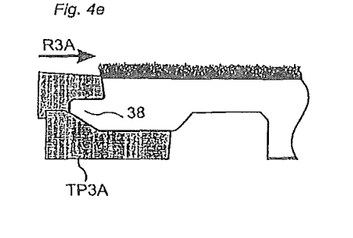
Figure 4F:
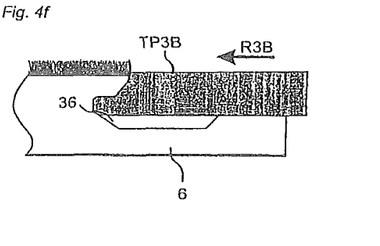

FIGS. 3a-c illustrate a floorboard which in this embodiment has a core 30 of a relatively soft material, such as MDF or particle board. The locking system has been adjusted to the soft core by the locking element 8 having a horizontal extent which is about 0.5 times the thickness of the core 30. The surface layer 31 has outer joint edges 40, 41 which in this embodiment project beyond the outer parts of the core 30. This projection can be some tenths of a millimeter. The outer parts of the surface layer are pressed together in connection with laying, and the floorboards will have very tight joints. The mechanical locking system guides the floorboards in exact positions and ensures a high quality of laying. In one embodiment the locking system may have a geometry where a play may exist, between the locking surface 9 of the locking element 8 and the locking groove 14, when the floorboards 1 and 1' are pressed together. The core 31 can have a thickness of e.g. 6-7 mm, and the surface layer 31 can have a thickness of 1-2 mm. In this embodiment, the total thickness of the floorboard can thus be about 7-9 mm, and the floor can then be joined to ordinary laminate floors having a thickness of about 7-8 mm. Other thicknesses can also be used in this invention.

FIGS. 4a-4f illustrate how joint edge portions can be machined. We have discovered that a soft surface layer of fibers cannot be machined accurately by means of cutting rotary tools which are normally used in manufacture of laminates and wooden floors and the wood-based core materials that are the most common ones in these cases. Loose fibers, especially in corner portions, cause a frayed joint edge. Plastics that are used in manufacture of synthetic fibers have as a rule a melting point round 120-160 degrees C. The fibers melt at high machining speeds. These problems can be solved by the surface layer being cut using, for instance, knives. These knives TP1A and TP1B can be rotary. The angle of action of the knives is indicated by the arrows R1a and R1b in FIGS. 4a, 4b. The knives, which can have other angles than the 90 degrees as shown, cut against the core 30, and in this embodiment the cut is placed outside the upper and outer part of the core in the completed floorboard. FIGS. 4c-f show that the entire joint system can be formed using merely 4 milling tools TP2A, TP2B, TP3A and TP3B which machine the core. The joint system in the shown embodiment is made in one piece with the core. It is also possible to make the whole, or parts of, the joint system of a material other than that of the core of the floorboard. For instance the strip 6 can be made of aluminum or of a sheet-formed blank which is machined to a strip and mechanically attached to the joint edge.

Figure 5A:
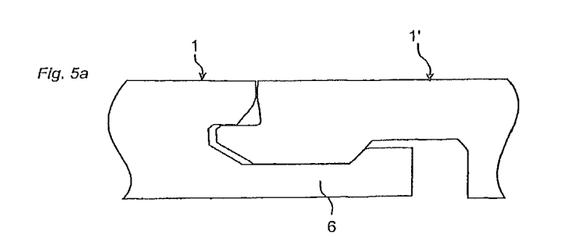
FIGS. 5a-c show a flow consisting of floorboards with different surface layers according to an embodiment of the invention.
Figure 5B:
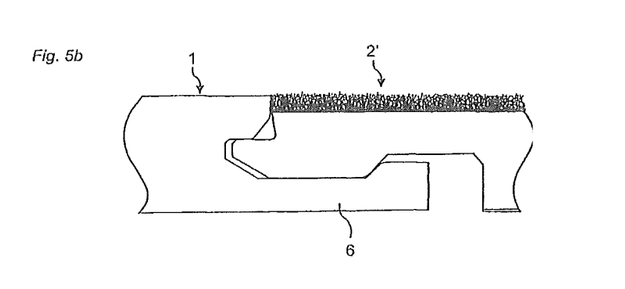
Figure 5C:
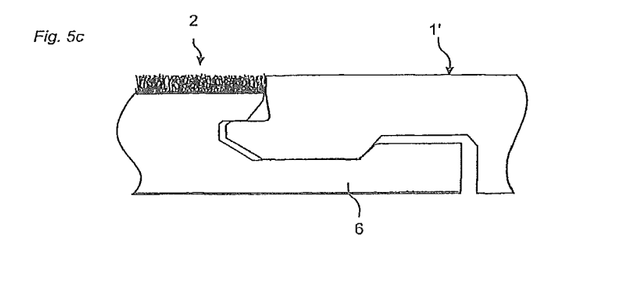

FIGS. 5a-c show floorboards with two surface layers. The floorboards 1, 1' can, for instance, have a surface layer of laminate or wood, and the floorboards 2, 2' can have a surface layer of e.g. needle felt, linoleum, plastic of some other suitable material. Also other combinations of materials may be used. FIGS. 5b and 5c show that joining to outer upper parts can take place, which are essentially positioned in the same plane. No transition strips are required.

In an alternative design, the fibers of the surface layer 31 may extend vertically such that the floorboard having the fiber surface layer appears slightly higher than the adjacent, "normal" floorboard. Hence, the vertical extension of the fiber surface layer may be used to provide a desired surface structure of the flooring, e.g. in order to provide the appearance of a rug being placed on a hard floor.

Figure 6A:
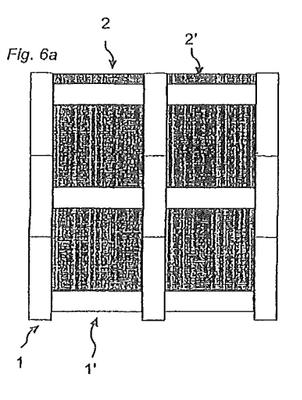
FIGS. 6a-d show embodiments of floors according to the invention.
Figure 6B:
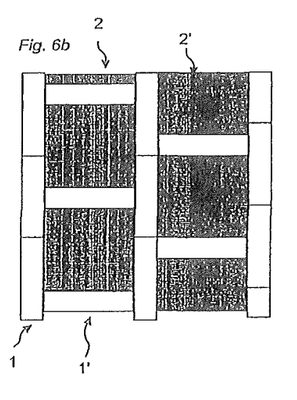

FIGS. 6a-6d show examples of floors that can be provided according to the invention. In FIG. 6a, the floorboards 2, 2' have a surface of needle felt. They can be square, for instance 40×40 cm. The floorboards 1, V can have a surface of laminate, wood, cork, linoleum, plastic etc. For example they can have a width of 10 cm and a length of 40 cm. In FIG. 6b, the squares are offset. If the harder floorboards 1, 1' are positioned at a somewhat lower level than the softer floorboards, the hard floorboards will not cause a high sound level since they will, to a limited extent, be in contact with shoes generating sound. Thus, the invention also concerns a set of floorboard with at least two different surface layers to provide a floor.

Figure 6C:
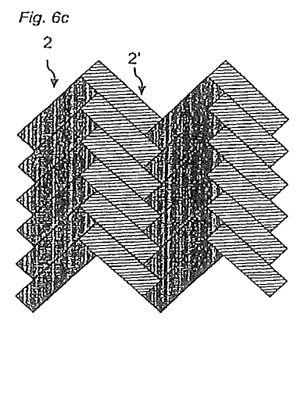
Figure 6D:
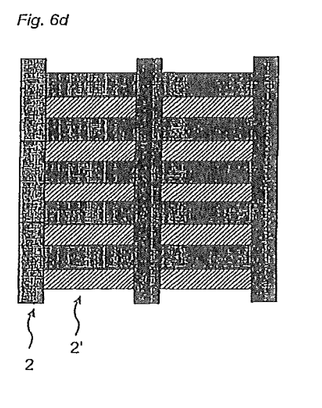

FIGS. 6c and 6d illustrate floors consisting of two different floorboards with surface layers of flexible fibers which differ from each other with respect to color, surface structure etc. In FIG. 6c, the floorboards are joined to form a herringbone pattern. They have mirror-inverted mechanical locking systems that allow joining of long side to short side by angling and/or snapping-in. The long sides can also be joined by angling and/or snapping-in. If the short sides of the floorboards in FIG. 6c have a locking system which only locks horizontally, the whole floor could be installed with angling only.

Figure 7A:
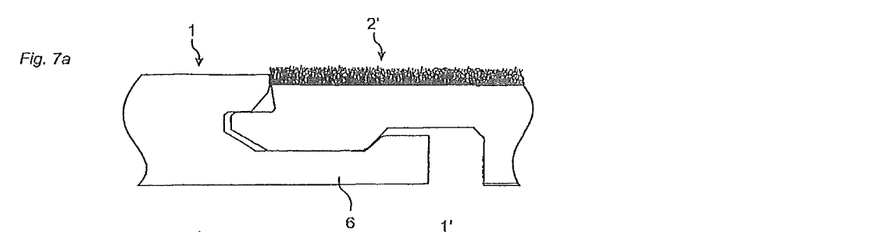
FIGS. 7a-e show embodiments off floors and locking systems according to the invention.

FIG. 7a shows a combination floor in which one floorboard 1 has a harder surface, such as laminate, wood, linoleum, plastic etc. than another floorboard 2'. One floorboard 2' has in this embodiment a softer surface layer which is positioned higher than the harder surface layer of the other 1' floorboard. It is preferable to position the softer surface layer on the same or higher level than the harder surface layer. The advantage is the softer and more flexible layer protects the edges of the hard surface.

Figure 7B:
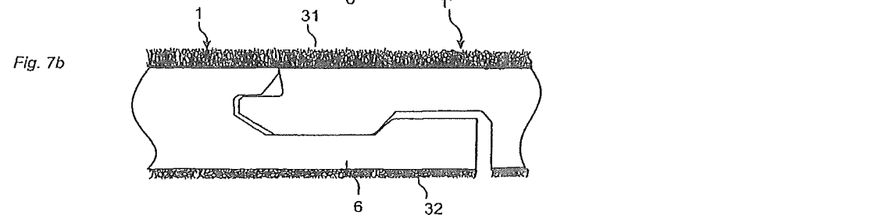

FIG. 7b shows a floorboard with a soft fibre layer 32 on the rear side which may be used as a balancing layer.

Figure 7C:
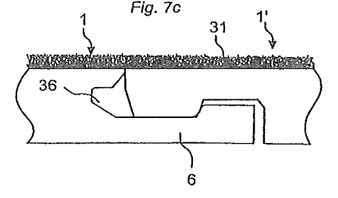
Figure 7D:
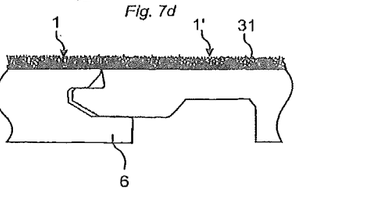

FIG. 7c shows a locking system which only locks horizontally and FIG. 7d shows a locking system which only locks vertically.

Figure 7E:
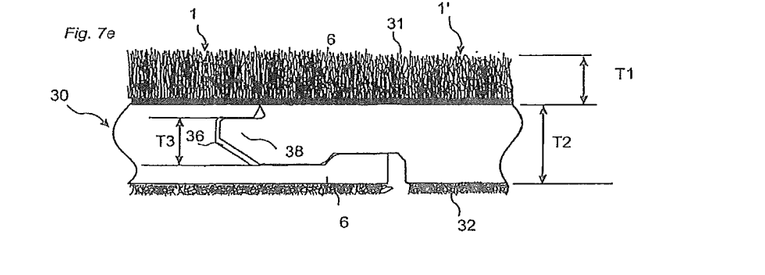

FIG. 7e shows a floorboard where the thickness T1 of the soft surface layer 31 is equal or larger than 0.5 times the thickness T2 of the core. Such a thin core gives several advantages related to production cost, transport, installation etc. It is possible to produce a mechanical locking system by machining in a sheet material which has a thickness of 3-5 mm only. Generally diamond tools are used and in order to reach the best cost and quality levels, the tools should be as thick and compact as possible. A difficult part to produce is the groove 36. In this embodiment the grove 36 and the tongue 38 has a vertical thickness T3 which is larger or equal than 0.5 times the thickness T2 of the core 30.

It is obvious that all known parquet and tile patterns can be made by means of floorboards according to the invention. The sides of the floorboards need not be perpendicular. The soft surface allows that also the thickness may be varied between different floorboards. If the core is made of a moisture-proof material, such as plastic or compact laminate, floorboards with a fiber surface resembling synthetic grass can be provided. Such floorboards can be laid immediately on the ground or on concrete, and they may, for instance, constitute tees on golf courses, balcony floors etc. During the winter, the boards can be taken up and stored under a roof.

Although only preferred embodiments are specifically illustrated and described herein, it will be appreciated that many modifications and variations of the present invention are possible in light of the above teachings and within the purview of the appended claims without departing from the spirit and intended scope of the invention.

The invention claimed is:

1. Floorboards configured to make a floating floor, the floorboards comprising a surface layer and a core, the floorboards are mechanically lockable and which along edge portions of the floorboards have pairs of opposing connectors configured for locking similar, adjoining ones of the floorboards to each other both vertically and horizontally, wherein the surface layer comprises flexible resilient fibers, and wherein a thickness of the surface layer is equal or larger than 0.5 times a thickness of the core.

2. The floorboards as claimed in claim 1, wherein the core is made of plastic.

3. The floorboards as claimed in claim 1, wherein the surface layer has a thickness of 1-2 mm.

4. The floorboards as claimed in claim 1, wherein the core has a thickness of 3-5 mm.

5. The floorboards as claimed in claim 1, wherein the connectors comprise a groove and a tongue configured for vertical locking.

6. The floorboards as claimed in claim 5, wherein the tongue and the groove have a vertical thickness which is larger or equal than 0.5 times the thickness of the core.

7. The floorboards as claimed in claim 1, wherein the connectors comprise a strip, a locking element and a locking groove configured for horizontal locking.

8. The floorboards as claimed in claim 7, wherein the locking element has a horizontal extent about 0.5 times the thickness of the core.

9. The floorboards as claimed in claim 1, wherein the floorboards are rectangular or square and wherein two opposite sides can be joined by inward angling, whereby upper adjoining joint edge portions are in contact with each other.

10. The floorboards as claimed in claim 9, wherein the upper adjoining joint edge portions of the floorboards are compressible and are configured to be changed in shape in connection with joining.

11. The floorboards as claimed in claim 1, wherein upper joint edges of the surface layer have a beveled portion.

12. The floorboards according to claim 1, wherein the flexible resilient fibers are made of synthetic fibers.

13. The floorboards according to claim 1, wherein the flexible resilient fibers are made of natural fibers.

14. The floorboards as claimed in claim 1, wherein the surface layer is made of needle felt.

15. The floorboards as claimed in claim 1, wherein the surface layer consists of flexible resilient fibers.

16. The floorboards as claimed in claim 1, wherein the surface layer is glued to the core.

17. The floorboards as claimed in claim 1, wherein the surface layer has a density below 400 kg/m3.

18. The floorboards as claimed in claim 1, wherein the surface layer has outer joint edges projecting beyond the outer parts of the core.

19. The floorboards as claimed in claim 1, the floorboards further comprising a balancing layer, wherein the balancing layer is arranged on a rear side of the core opposite the surface layer.

20. The floorboards as claimed in claim 19, wherein the balancing layer comprises foam, needle felt, or cardboard.

* * * * *